(12) United States Patent
Provost

(10) Patent No.: US 6,543,718 B2
(45) Date of Patent: Apr. 8, 2003

(54) ENGINE ARRANGEMENT

(75) Inventor: Michael J Provost, Nottingham (GB)

(73) Assignee: Rolls-Royce plc, London (GB)

( * ) Notice: Subject to any disclaimer, the term of this patent is extended or adjusted under 35 U.S.C. 154(b) by 58 days.

(21) Appl. No.: 09/768,590

(22) Filed: Jan. 25, 2001

(65) Prior Publication Data

US 2001/0011691 A1 Aug. 9, 2001

(30) Foreign Application Priority Data

Feb. 9, 2000 (GB) .............................................. 0002825

(51) Int. Cl.⁷ .............................................. B64C 15/12
(52) U.S. Cl. .................................................... 244/12.4
(58) Field of Search ............................. 244/12.3, 12.4, 244/12.5, 13, 50, 66

(56) References Cited

U.S. PATENT DOCUMENTS

| | | | | |
|---|---|---|---|---|
| 489,343 A | * | 1/1893 | Kamo ........................... 156/60 |
| 3,038,683 A | * | 6/1962 | Rowe ......................... 244/12.4 |
| 3,259,343 A | * | 7/1966 | Roppel ....................... 244/12.4 |
| 3,633,847 A | * | 1/1972 | Fricke et al. ............... 244/12.4 |
| 3,666,209 A | * | 5/1972 | Taylor ........................ 244/12.4 |
| 3,972,490 A | | 8/1976 | Zimmermann | |
| 3,995,794 A | * | 12/1976 | Lanier ........................ 244/12.4 |
| 4,482,108 A | * | 11/1984 | Sutton ........................ 244/12.4 |
| 5,131,605 A | * | 7/1992 | Kress ......................... 244/12.4 |
| 5,758,844 A | * | 6/1998 | Cummings ................. 244/12.4 |

FOREIGN PATENT DOCUMENTS

| | | |
|---|---|---|
| GB | 764 684 SP | 1/1957 |
| GB | 842 363 SP | 7/1960 |
| GB | 1 074 387 SP | 7/1967 |
| GB | 2 111 929 A | 7/1983 |
| WO | WO PCT/CH86/00086 A | 12/1986 |

* cited by examiner

Primary Examiner—Peter M. Poon
Assistant Examiner—Kevin Jakel
(74) Attorney, Agent, or Firm—W. Warren Taltavull; Manelli, Denison & Selter PLLC

(57) ABSTRACT

An engine arrangement (10) comprises propulsion means for propelling the aircraft (12), and drive means to drive the propulsion means. The arrangement (10) further includes mounting means to mount at least the propulsion means in a location spaced above the upper surface of the aircraft (10). In the preferred embodiment, the propulsion means is in the form of tip driven fans (14), and the drive means comprises gas generators (34) mounted within the body of the aircraft (10) fixedly connected by intake ducts (36) to the underside of the aircraft (10).

19 Claims, 4 Drawing Sheets

ENGINE ARRANGEMENT

FIELD OF THE INVENTION

This invention relates to engine arrangements. More particularly the invention relates to engine arrangements for blended wing-body aircraft.

BACKGROUND OF THE INVENTION

The design of blended wing-body, or flying wing, aircraft requires somewhat different considerations than are necessary with conventional aircraft. Despite the promise of greater efficiency with such aircraft, there are a number of difficult structural and aerodynamic issues that need to be addressed before blended wing-body aircraft become commercially viable alternatives to conventional aircraft.

However, one problem with proposed designs is that the air flow which generates lift can be disrupted by the operation of the engine. A further problem with blended wing-body aircraft is that a large amount of power is required to move the aircraft control surfaces.

SUMMARY OF THE INVENTION

According to one aspect of this invention there is provided an engine arrangement for a blended wing-body aircraft, the arrangement comprising propulsion means for propelling the aircraft and drive means to drive the propulsion means, and the arrangement further including mounting means to mount at least said propulsion means in a location spaced from an upper or lower surface of said aircraft, and means for moving the propulsion means relative to the aircraft.

According to another aspect of this invention there is provided an engine arrangement for an aircraft, the arrangement comprising propulsion means for propelling the aircraft and drive means to drive the propulsion means, and the arrangement further including mounting means to mount at least said propulsion means in a location spaced from an upper or lower surface of said aircraft at a rear region of the aircraft. Preferably, the arrangement includes means for moving the propulsion means relative to the aircraft.

Preferably, the drive means is separate from the propulsion means. In one embodiment, the mounting means is adapted to mount only the propulsion means on said aircraft. The drive means may be adapted to be provided on, in, or under the aircraft. The propulsion means preferably comprises a fan comprising a plurality of fan blades, and may also include a turbine comprising a plurality of turbine blades. The turbine blades may be provided on the fan blades and are, preferably, substantially concentrically mounted on the fan blades. Advantageously, the turbine blades are provided radially outwardly of the fan blades.

In the preferred embodiment, the propulsion means comprises a tip driven fan, whereby the turbine blades are mounted on and extend radially outwardly from the outer ends of the fan blades.

The mounting means may comprise a pylon adapted to extend between the propulsion means and the aircraft.

Preferably, the propulsion means includes a housing or nacelle, the mounting means extending between the housing and the aircraft.

The drive means may comprise a gas generator operable to generate gas to drive the propulsion means. Preferably, the gas generator comprises a gas turbine arrangement comprising a compressor assembly, a combustor assembly and a turbine assembly in axial flow series.

A plurality of gas generators may be provided to drive the propulsion means.

A conduit arrangement may be provided between the drive means and the propulsion means. Preferably at least a part of the conduit arrangement extends through the mounting means. The conduit arrangement may further include a plenum chamber which, where there are a plurality of gas generators, may receive gas from each gas generator.

Valve means may be provided between the drive means and the propulsion means to prevent reverse flow of gas into the drive means.

Preferably, the valve means is provided between the drive means and the plenum chamber. Preferably, the valve means is provided immediately upstream of the plenum chamber.

Preferably, the moving means is adapted to move the propulsion means, preferably by tilting the propulsion means to assist in controlling the pitch of the aircraft. Additionally, or alternatively, the moving means may be adapted to move the propulsion means to control the yaw of the aircraft.

In one embodiment, the propulsion means is pivotally attached to the mounting means, and the moving means may be adapted to apply a force to the propulsion means. Preferably, the propulsion means is pivotally attached to the mounting means about an axis substantially parallel to the pitch axis of the aircraft, whereby the moving means may control the pitch of the aircraft.

In an alternative embodiment the propulsion means is rigidly attached to the mounting means and the latter is movable relative to the aircraft. Preferably the mounting means is tiltable about an axis substantially parallel to the pitch axis of the aircraft. Moving means may be provided to tilt the mounting means relative to the aircraft.

The moving means may comprise an hydraulic ram, motor driven gearing or aerodynamic members in the form of vanes extending internally and/or externally of the propulsion means.

Where the propulsion means is fixedly mounted to the mounting means, means may be provided between the mounting means and the aircraft and tiltably mount the mounting means on the aircraft. In this embodiment, the conduit extending through the mounting means may comprise a flexible portion to allow the conduit within the mounting means to move.

According to another aspect of the invention, there is provided an aircraft incorporating an engine arrangement as described above, wherein at least the propulsion means is provided towards the rear of the aircraft.

The drive means may be provided in, under, or on, the body of the aircraft. Where the drive means is provided in the aircraft, air inlet ducts extend from the drive means to an external surface of the aircraft and communicate with an air inlet opening therein. Preferably said air inlet opening is provided in the underside of the aircraft.

BRIEF DESCRIPTION OF THE DRAWINGS

Embodiments of the invention will now be described by way of example only, with reference to the accompanying drawings, in which.

DETAILED DESCRIPTION OF THE INVENTION

Figure 1:
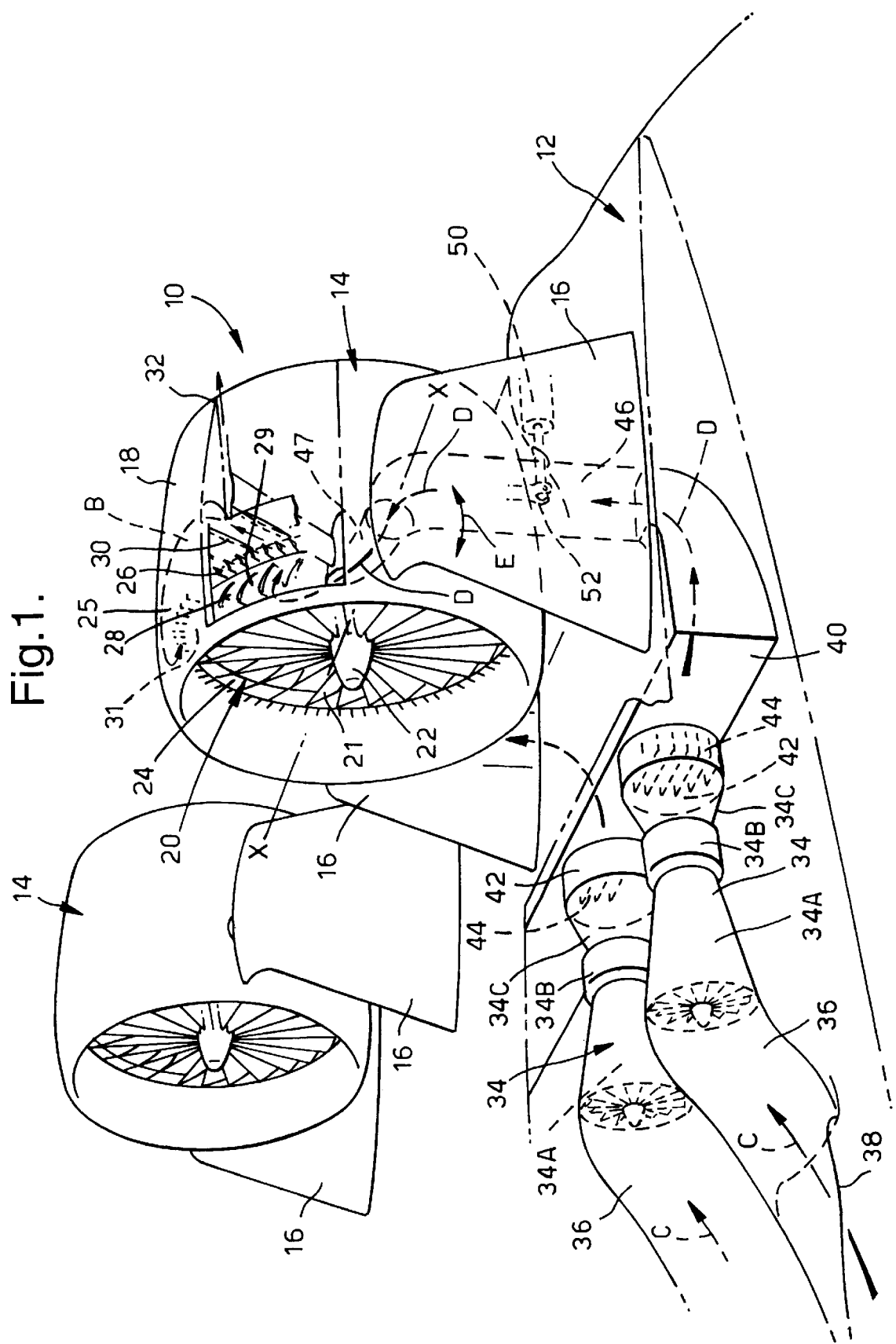
FIG. 1 is a diagrammatic part sectional view of an aircraft incorporating an engine arrangement according to one embodiment of the invention.

Referring to FIG. 1, there is shown an engine arrangement 10 mounted on an aircraft 12 at a rear region of the aircraft. The engine arrangement 10 comprises propulsion means comprising a pair of tip driven fans 14. Each fan 14 is mounted on the aircraft 12 by mounting means in the form of a pair of pylons 16 provided one at either side of the fan. Only one of the fans 14 is described herein, the other being substantially identical.

The tip driven fan 14 comprises a housing in the form of a nacelle 18 having inner and outer shells. The nacelle contains a fan assembly 20 comprising a plurality of radially extending fan blades 21 rotatably mounted on bearings on a central shaft 22. An annular shroud 24 is fixedly mounted on and interconnects the fan blades 21 at the peripheries thereof. A plurality of turbine blades 26 are carried on the outer surface 27 of the annular shroud 24, and form a turbine assembly 25 also housed within the nacelle 18.

The turbine assembly 25 includes a first arrangement of nozzle guide vanes 28 extending between the inner and outer skins of the nacelle 18 in a plurality of first sectors 29 circumferentially spaced around the nacelle 18. Only one first sector 29 is shown in FIG. 1. The nozzle guide vanes 28 direct air onto the turbine blades 26, thereby driving the fan blades 21 via the annular shroud 24. This constitutes a first pass of gas through the turbine assembly.

A second arrangement of guide vanes 30 mounted within the nacelle 18 in a plurality of second sectors 31 (only one of which is shown in FIG. 1). The second sectors 31 alternate with, and are isolated from, the first sectors 29. The guide vanes 30 direct gas exhausted from the turbine blades 26 back to the turbine blades 26 through appropriate ducting for the second pass, as shown by the arrow B.

After passing through the turbine assembly 25 for the second time, the gases are exhausted from the nacelle 18 via an annular slot 32 extending around the trailing edge of the nacelle 18.

An example of a tip driven fan is described in U.K. Patent Specification No. GB1324240.

The driving gas for the turbine blades 28 and, hence, the fan blades 21 is provided by drive means in the form of a pair of gas generators 34 each of which comprises, in axial flow series, a compressor 34A, a combustor 34B, and a turbine 34C. The gas generators 34 are mounted within the body of the aircraft, and are communicatively connected to the exterior thereof via respective air intake ducts 36 and air intake apertures 38 (only one of which is shown in FIG. 1) on the underside of the aircraft.

The gas generators 34 are connected to a common plenum chamber 40 via respective exhaust ducts 42 and valves 44, provided between the exhaust duct 42 and the plenum chamber 40. The valves 44 prevent the back flow of any air from the plenum chamber 40 into the gas generators 34. A conduit 46 extends through each of the pylons 16 to a duct 47 in the nacelle 18. The duct 47 extends to the guide vanes 28. Thus the driving gas is directed from the plenum chamber 40 via the conduit 46 and the duct 47 to the turbine assembly 25 as shown by the arrows D.

The engine arrangement described above is particularly adapted for use with a blended wing-body aircraft. In such aircraft operation of the aircraft control surfaces, e.g. the elevators, require a considerable amount of power, which can cause a drain on the power to propel the aircraft. In order to alleviate this problem, the embodiments of the invention described herein have been designed to assist or eliminate the control surfaces, by enabling the propulsion means to be tilted relative to the body of the aircraft. For this purpose, the embodiment shown in FIG. 1 includes tilting means in the form of an hydraulic ram 50 mounted on the aircraft 10. The hydraulic ram 50 is connected to the nacelle 18 via a link 52. Operation of the ram 50 can tilt the nacelle 18 in either of the opposite directions indicated by the arrow E.

In operation, air is drawn into the intake apertures 38 on the underside of the aircraft 10 and passes through the ducts 36, as indicated by the arrows C, to the compressors 34A of the respective gas generators 34. The air is mixed with fuel and combusted in the combustors 34B whereupon the combustion products expand through and drive the turbines 34C of the gas generators 34, before flowing into the exhaust ducts 42. The gas is exhausted therefrom via the valves 44 at high pressure into the plenum chamber 40. The high pressure exhaust gas then passes via the conduits 46 in the pylons 16 and through the associated apertures 48 into the ducts 47 in the nacelle 18 to drive the turbine blades 28, thereby driving the fan assembly 21, to produce the necessary thrust to propel the aircraft.

Each fan 14 has an axis X—X which is parallel to the pitch axis of the aircraft. In order to assist the aircraft's flaps, the nacelle 18 can be tilted about the axis X—X, by the ram 50. Thus, the thrust from the tip driven fans 14 can be directed either to control the attitude of the aircraft thereby reducing, or in some cases, eliminating the amount of power required to move the flaps for the same purpose.

While FIG. 1 shows two fans 14, each of which is provided with two gas generators 34, it will be appreciated, that any suitable number of gas generators 34 may be provided for each of the fan assemblies 14. Alternatively both fan assemblies 14 could be connected to all the gas generators 34 via a single plenum chamber 40. The number of fans 14 can also be varied.

The positioning of the tip driven fan 14 spaced above the upper surface of the aircraft 12 has the advantage that the air which flows over the surface of the aircraft, and hence the lift that is generated, is not detrimentally affected by the changes in air flow which occur when engines are throttled up and down during take-off and landing and in flight.

Figure 2:
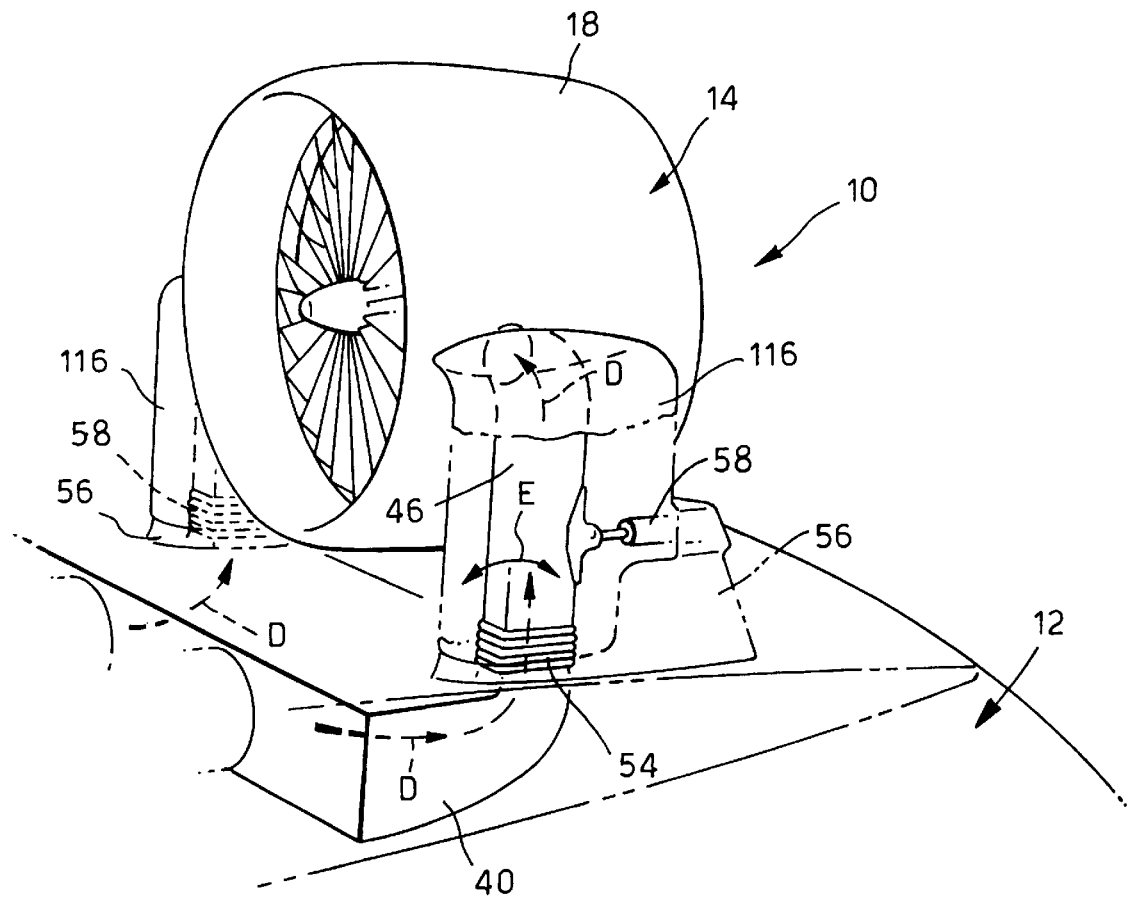
FIGS. 2 to 4 are part sectional diagrammatic views of different embodiments of propulsion means.
Figure 3:
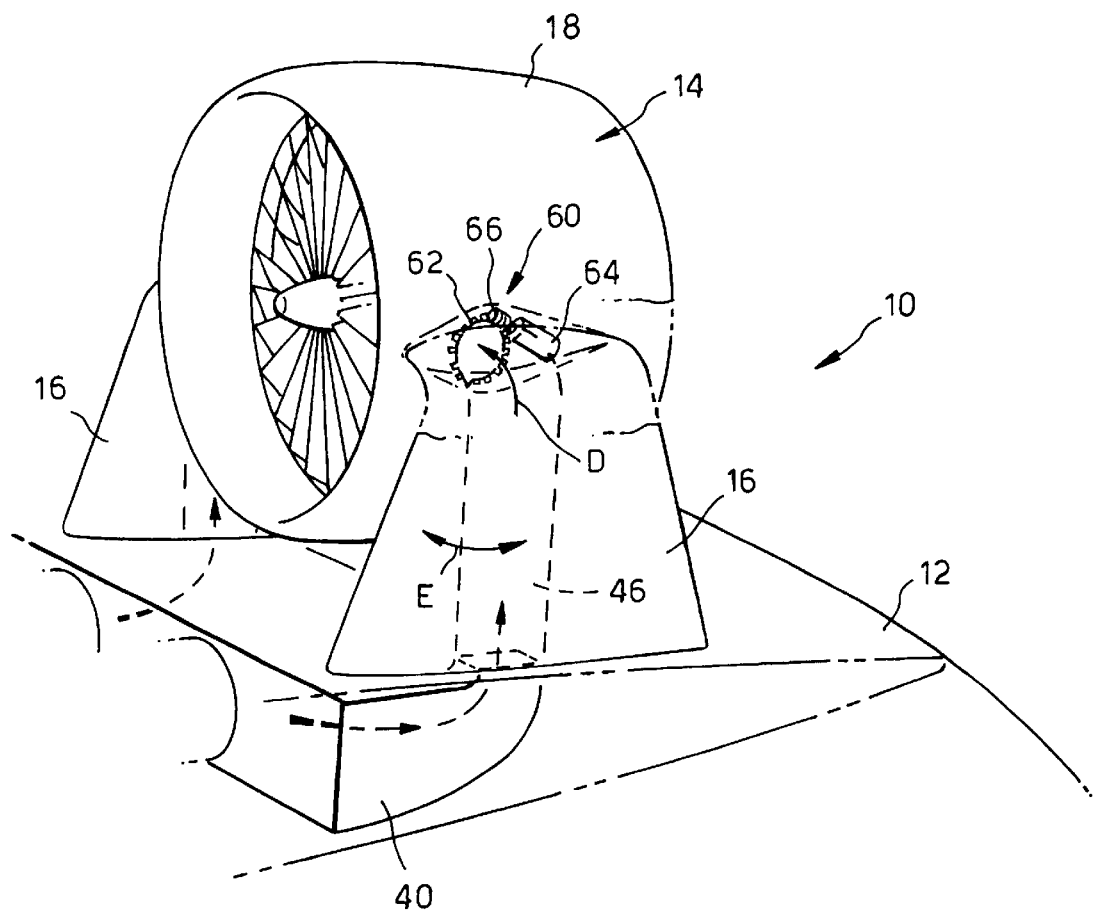
Figure 4:
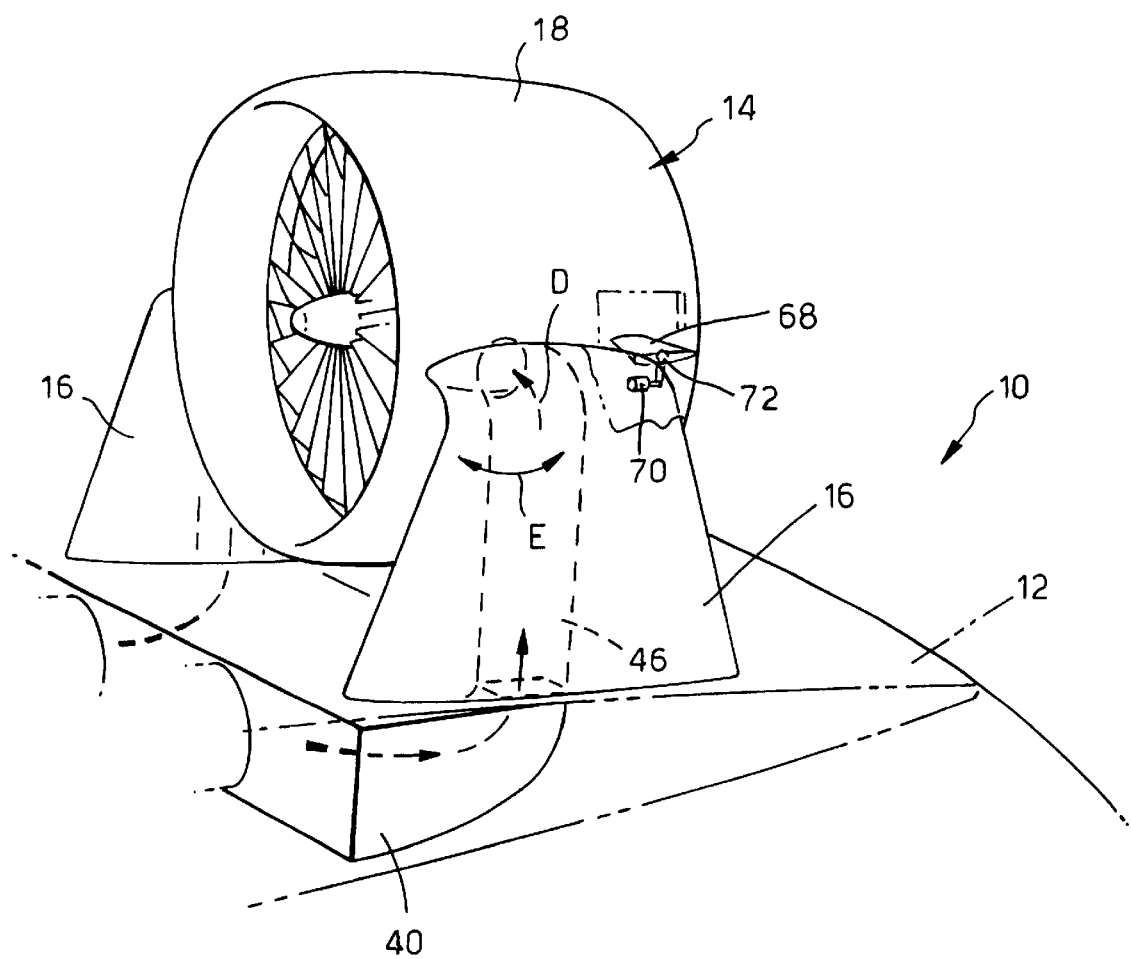

FIGS. 2 to 4 show different embodiments of the means for tilting the tip driven fan 14. The embodiments shown in FIGS. 2 to 4 comprise many of the same features as in FIG. 1, and these have been designated with the same reference numeral as in FIG. 1.

In FIG. 2, the fixed pylons 16 have been replaced by tiltable pylons 116, and the fan 14 is fixedly attached to the pylons 116, which are slidably received over lugs 56 for reasons that will be explained below. Suitable sliding joints are provided between the lugs 56 and the respective pylons 116. The conduit 46 is connected to the plenum chamber 40 via a flexible bellows arrangement 54.

The means for tilting the fan 14 is in the form of two hydraulic rams 58 each extending between the respective one of the lugs 56, and a respective one of the pylons 116. Only one of the rams 58 can be seen in FIG. 2. Actuation of the rams 58 causes the pylons 116 to be tilted in either direction indicated by the arrow E1, thereby also tilting the fan 14.

Referring to FIG. 3, there is shown a further embodiment, in which the fan 14 is pivotally mounted on the pylon 16, but the ram 50 has been replaced by a motor and gear arrangement 60, which comprises a cog wheel 62 fixedly mounted on the nacelle 18, and a motor 64 fixedly mounted on the pylon 16. A worm gear 66 is driven by the motor 64 and meshes with the cog wheel 62.

Actuation of the motor 64 rotates the worm gear 66 which, in turn, causes the cog wheel 62, and thereby the nacelle 18 to rotate in the directions indicated by the arrow E.

A further embodiment is shown in FIG. 4, in which the fan 14 comprises an aerodynamic vane 68 pivotally mounted on the nacelle 18 either inside the fan 14, in the stream of air flowing therethrough, or on the outside of the fan 14 in the air flowing around the nacelle 18. A motor 70 fixedly mounted on the nacelle 18 is connected to the vane 68 via a lingage 72, whereby actuation of the motor 70 can rotate the vane 68 in either of the directions indicated by the arrow E. The flow of air over the vane 68 then causes the fan 14 to tilt in the opposite direction.

There is thus described several embodiments of an engine arrangement, which is particularly suitable for use in blended wing-body aircraft, but which can also be used in other types of aircraft. Each of the embodiments described above has the advantage that the fan providing the thrust for the aircraft is spaced from the upper surface of the body of the aircraft as far rearward as possible thereby having minimal effect on the air flow over the upper surface. Similarly, provision of engine intake apertures on the lower surface of the aircraft body does not effect the air flow on the upper surface.

The above described embodiments also solve the problem of the amount of power required to control the flaps of the aircraft by enabling the fan to be tilted about an axis parallel to the pitch axis of the aircraft, thereby assisting with the control of the attitude of the aircraft.

Various modifications can be made without departing from the scope of the invention. For example, suitable means could be provided for enabling the fan assembly to be pivoted about an axis perpendicular to the pitch axis to control the yaw of the aircraft. Also, the gas generators 34, which in the embodiments comprise conventional gas turbine arrangements, could be replaced by alternative forms of gas generator such as arrangements incorporating intercoolers and/or recuperators. Another possible modification is that the fan 14 could be provided on the underside of the aircraft, such that the fan 14 is spaced from the lower surface.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An engine arrangement for an aircraft, the arrangement comprising propulsion means for propelling the aircraft and drive means to drive the propulsion means, and the arrangement further including mounting means to mount at least said propulsion means in a location spaced from a surface of said aircraft, and means for moving the propulsion means relative to the aircraft, said moving means comprises aerodynamic members pivotally mounted on the propulsion means and actuation means to tilt the aerodynamic members.

2. An engine arrangement according to claim 1, wherein the moving means is adapted to move the propulsion means to assist in controlling one or both of the pitch of the aircraft, and the yaw of the aircraft.

3. An engine arrangement according to claim 2, wherein the propulsion means is pivotally attached to the mounting means about an axis parallel to the pitch axis of the aircraft, and the moving means is adapted to apply a force to the propulsion means to pivot the propulsion means about said axis.

4. An engine arrangement according to claim 2, wherein the propulsion means is fixedly mounted to the mounting means, and the mounting means is adapted to be movably mounted to the aircraft, the moving means being adapted to apply a force to the mounting means.

5. An engine arrangement according to claim 4, wherein means is provided to tiltably mount the mounting means on the aircraft.

6. An engine arrangement according to claim 1 wherein the moving means comprises a ram.

7. An engine arrangement according to claim 1, wherein the moving means comprises a gearing arrangement driven by a motor.

8. An engine arrangement according to claim 1, wherein the aerodynamic members are in the form of vanes which extend one of internally and externally of the propulsion means.

9. An engine arrangement according to claim 1, wherein the drive means is separate from the propulsion means and the mounting means is adapted to mount only the propulsion means on said aircraft, the drive means being adapted to be provided on, in and or under the aircraft.

10. An engine arrangement according to claim 1 wherein the propulsion means comprises a fan having a plurality of fan blades, and a turbine having a plurality of turbine blades.

11. An engine arrangement according to claim 10, in which the propulsion means comprises a tip driven fan in which the turbine blades are concentrically mounted on and extend radially outwardly of the fan blades.

12. A blended wing-body aircraft comprising an engine arrangement as claimed in claim 1, wherein at least the propulsion means is provided at the rear the aircraft.

13. An aircraft according to claim 12, wherein the drive means is provided in, under, or on, the body of the aircraft.

14. A blended wing-body aircraft comprising an engine arrangement as claimed in claim 1.

15. An engine arrangement for an aircraft, the arrangement comprising propulsion means for propelling the aircraft and drive means to drive the propulsion means, and the arrangement further including mounting means to mount at least said propulsion means in a location spaced from a surface of said aircraft, and means for moving the propulsion means relative to the aircraft, the drive means comprising a gas generator operable to drive the propulsion means, the generator comprising at least one gas turbine arrangement comprising a compressor, a combustor and a turbine in axial flow series, wherein the conduit arrangement includes a plenum chamber adapted to receive gas from the gas generator, the engine arrangement including valve means between the or each gas generator and the propulsion means to prevent reverse flow of gas into the drive means.

16. An engine arrangement according to claim 15, including a conduit arrangement extending between the gas generator and the propulsion means, and at least a part of the conduit arrangement extending through the mounting means.

17. An engine arrangement according to claim 16, wherein the part of the conduit extending through the mounting means includes a flexible position to allow movement of said part relative to the remainder of the conduit.

18. An engine arrangement according to claim 15 including a plurality of gas generators, wherein the plenum chamber extends across each of them to receive gas from each generator.

19. An engine arrangement for an aircraft, the arrangement comprising propulsion means for propelling the aircraft and drive means to drive the propulsion means, and the arrangement further including mounting means to mount at least said propulsion means in a location spaced from a surface of said aircraft, and means for moving the propulsion means relative to the aircraft, wherein at least the propulsion means is provided at the rear of the aircraft and the drive means is provided in the aircraft and air inlet ducts extend from the drive means to the underside of the aircraft, said ducts communicating with an opening in said underside.

* * * * *